US012562613B2

(12) United States Patent
Sato et al.

(10) Patent No.: US 12,562,613 B2
(45) Date of Patent: Feb. 24, 2026

(54) ELECTRONIC CONTROL DEVICE

(71) Applicant: HITACHI ASTEMO, LTD.,
Hitachinaka (JP)

(72) Inventors: Hiroshi Sato, Hitachinaka (JP);
Kohtaro Shiino, Hitachinaka (JP);
Yuichi Yanagisawa, Hitachinaka (JP);
Susumu Kaneko, Hitachinaka (JP);
Masao Fujimoto, Hitachinaka (JP)

(73) Assignee: HITACHI ASTEMO, LTD.,
Hitachinaka (JP)

( * ) Notice: Subject to any disclaimer, the term of this patent is extended or adjusted under 35 U.S.C. 154(b) by 253 days.

(21) Appl. No.: 18/259,556

(22) PCT Filed: Dec. 10, 2021

(86) PCT No.: PCT/JP2021/045480
§ 371 (c)(1),
(2) Date: Jun. 27, 2023

(87) PCT Pub. No.: WO2022/145195
PCT Pub. Date: Jul. 7, 2022

(65) Prior Publication Data
US 2024/0055930 A1    Feb. 15, 2024

(30) Foreign Application Priority Data
Dec. 28, 2020    (JP) ................................. 2020-218159

(51) Int. Cl.
*H02K 5/16*        (2006.01)
*B62D 5/04*        (2006.01)
(52) U.S. Cl.
CPC ............. *H02K 5/161* (2013.01); *B62D 5/046* (2013.01)

(58) Field of Classification Search
CPC ...... B62D 5/0406; H02K 5/225; H02K 9/227; H02K 11/33
See application file for complete search history.

(56) References Cited

U.S. PATENT DOCUMENTS

2012/0286605 A1* 11/2012 Miyachi ................. H02K 5/225
                                                           310/71
2013/0257232 A1* 10/2013 Tomizawa ............. H02K 29/08
                                                           310/68 R
(Continued)

FOREIGN PATENT DOCUMENTS

JP        2016-063619 A      4/2016
JP        2018-126043 A      8/2018
JP        2020127334 A  *  8/2020  ........... B62D 5/0406

OTHER PUBLICATIONS

JP-2020127334-A machine translation May 3, 2025.*
(Continued)

*Primary Examiner* — Leda T Pham
(74) *Attorney, Agent, or Firm* — FOLEY & LARDNER LLP

(57) ABSTRACT

In an electronic control device E1 according to the present invention, a first board 50 and a second board 60 are connected to each other via connection members 801, 802. Thus, with the connection members 801, 801, it is possible to fix the first board 50 and the second board 60 without sacrificing areas for mounting electronic components on the first board 50 and the second board 60. Accordingly, it is possible to ensure sufficient mounting areas on the first board 50 and the second board 60, which contributes to downsizing the electronic control device E1.

11 Claims, 11 Drawing Sheets

(56)  References Cited

U.S. PATENT DOCUMENTS

2016/0134178 A1 *  5/2016  Acinas Lope ....... B62D 5/0406
310/64
2019/0372420 A1  12/2019  Ogawa et al.

OTHER PUBLICATIONS

International Preliminary Report on Patentability dated Jul. 13, 2023 issued in International Patent Application No. PCT/JP2021/045480, with English translation, 12 pages.
International Search Report dated Feb. 22, 2022 issued in International Patent Application No. PCT/JP2021/045480, with English translation, 5 pages.

* cited by examiner

ELECTRONIC CONTROL DEVICE

TECHNICAL FIELD

The present invention relates to an electronic control device.

BACKGROUND ART

A patent document 1 discloses a known conventional electronic control device as follows.

The electronic control device is configured integrally with an electric motor to be controlled, wherein a board housing is connected to an end part of a motor housing, wherein the board housing accommodates a circuit board for driving and controlling the electric motor, and wherein the motor housing accommodates components of the electric motor. The board housing is formed in a bottomed cylindrical shape. Inside the board housing, a first board and a second board are arranged to face each other and overlap each other in a direction of a rotational axis of the motor.

The first board is fixed to the board housing by screwing a peripheral part of the first board to bosses projecting from a bottom of the board housing. On the other hand, the second board is notched so as not to interfere with the bosses, arranged between the first board and the bottom of the board housing, and fixed to the bottom of the board housing by screwing.

PRIOR ART DOCUMENT(S)

Patent Document(s)

Patent Document 1: JP 2016-63619 A

SUMMARY OF INVENTION

Problem(s) to be Solved by the Invention

However, in the conventional electronic control device, the fixation of the second board requires to avoid interference with the bosses, and therefore form the second board to be partly notched. The notching causes a decrease in area of the second board for mounting. Therefore, in order to ensure a sufficient mounting area of the second board, the second board is required to be upsized. This may cause the electronic control device to be upsized.

Accordingly, the present invention has been devised in view of the technical problems described above with the conventional electronic control device. It is an abject of the present invention to provide an electronic control device which is suppressed from being upsized while ensuring a sufficient mounting area of a circuit board.

Means for Solving the Problem(s)

According to one aspect of the present invention, a first board and a second board of a circuit board set are connected to each other by a connection member disposed between the first board and the second board.

Effect(s) of the Invention

According to the present invention, it is possible to suppress the electronic control device from being upsized while ensuring a sufficient mounting area of the circuit board set.

MODE(S) FOR CARRYING OUT INVENTION

The following details electronic control devices according to embodiments of the present invention with reference to the drawings. The electronic control device according to each embodiment of the present invention is applied to an electric power steering device for an automobile. In the following description, a direction along a rotational axis Z of a motor is referred to as "axial direction", a direction perpendicular to the rotational axis Z is referred to as "radial direction", and a direction about the rotational axis Z is referred to as "circumferential direction".

Configuration of Electronic Control Device

First Embodiment

Figure 1:
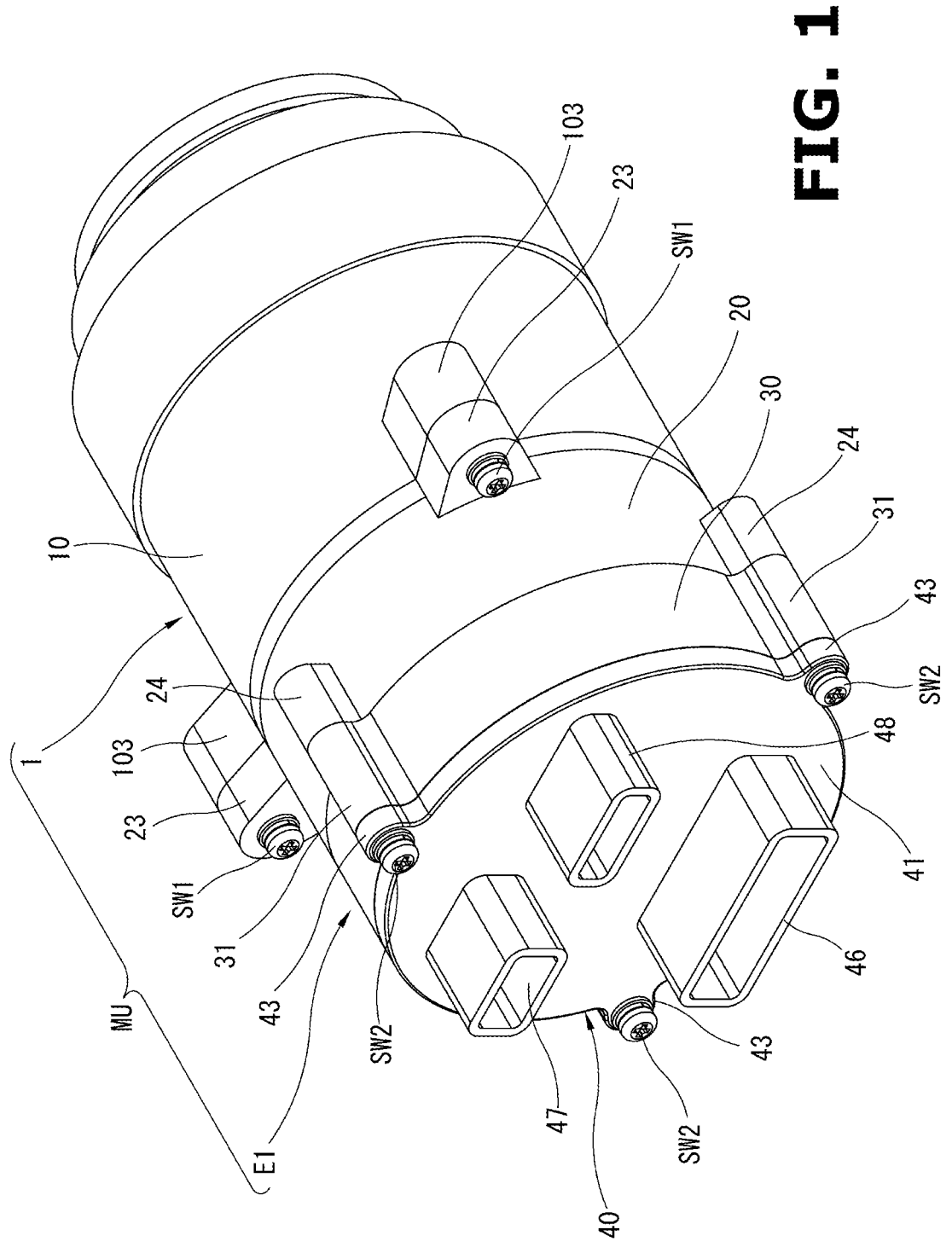
FIG. 1 is a perspective view of an electronic control device according to a first embodiment of the present invention.

FIG. 1 shows a perspective view of an electronic control device E1 according to a first embodiment of the present invention, showing an appearance of the electronic control device E1.

As shown in FIG. 1, the electronic control device E according to the present invention is arranged in series with an axial end part of a motor 1 to be controlled. Thus, the electronic control device E and the motor 1 are formed integrally with each other in a form of so-called electromechanical integration. The electronic control device E and the motor 1 constitute a motor unit MU. The motor unit MU is mounted in a power steering device not shown to generate an assist torque in accordance with an input torque from a steering wheel not shown, and thereby assist a driver in steering operation.

The motor 1 includes a motor rotating shaft 11 having a first end part 111 connected to a steering shaft, a rack shaft, etc., not shown, of the power steering device via an arbitrary speed reduction mechanism not shown. Accordingly, the assist torque generated by the motor 1 is transmitted to the steering shaft and the rack shaft through the speed reduction mechanism, thereby assisting rotation of the steering shaft and movement of the rack shaft.

Figure 2:
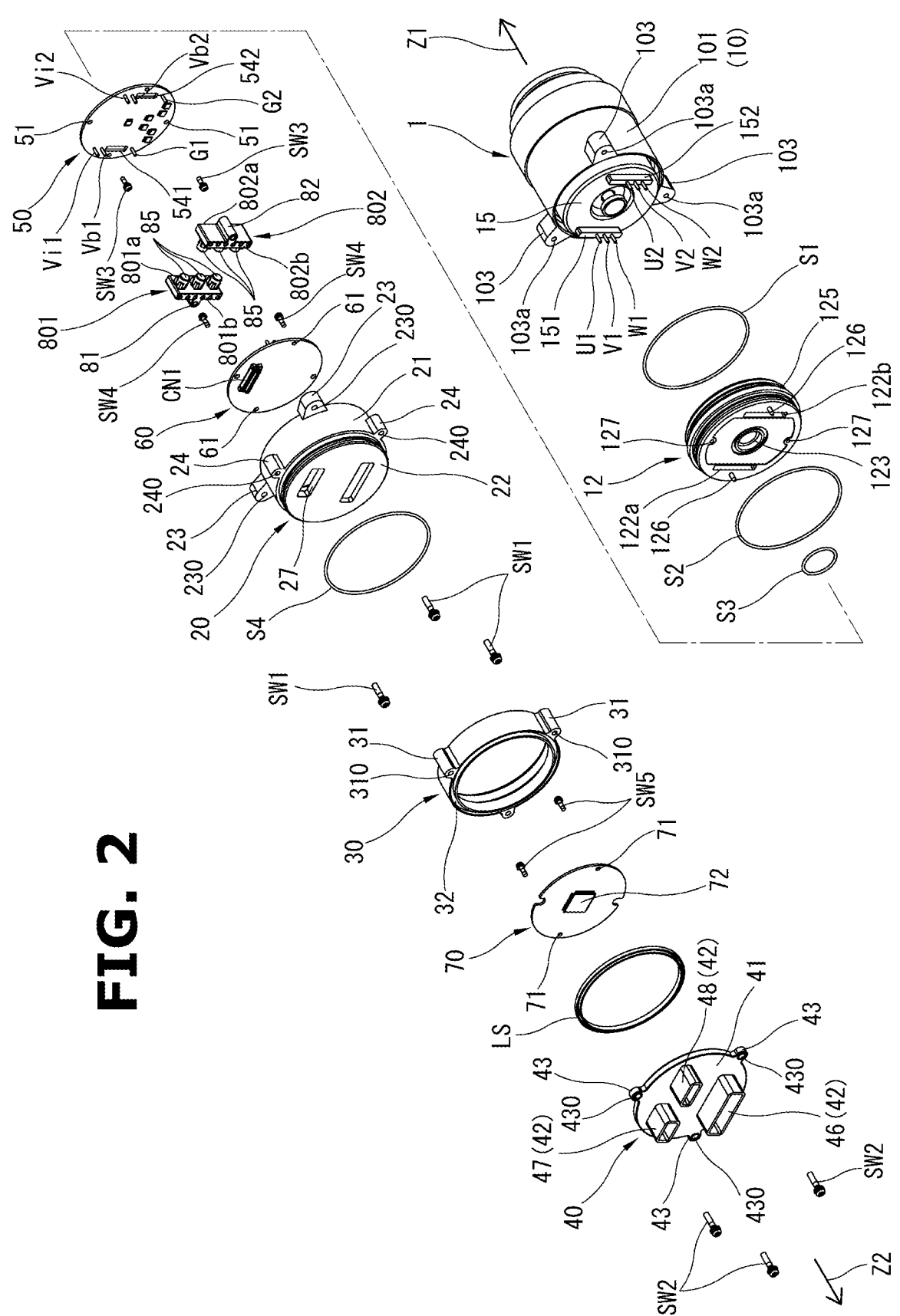
FIG. 2 is an exploded perspective view of the electronic control device according to the first embodiment of the present invention as viewed from a cover side.
Figure 3:
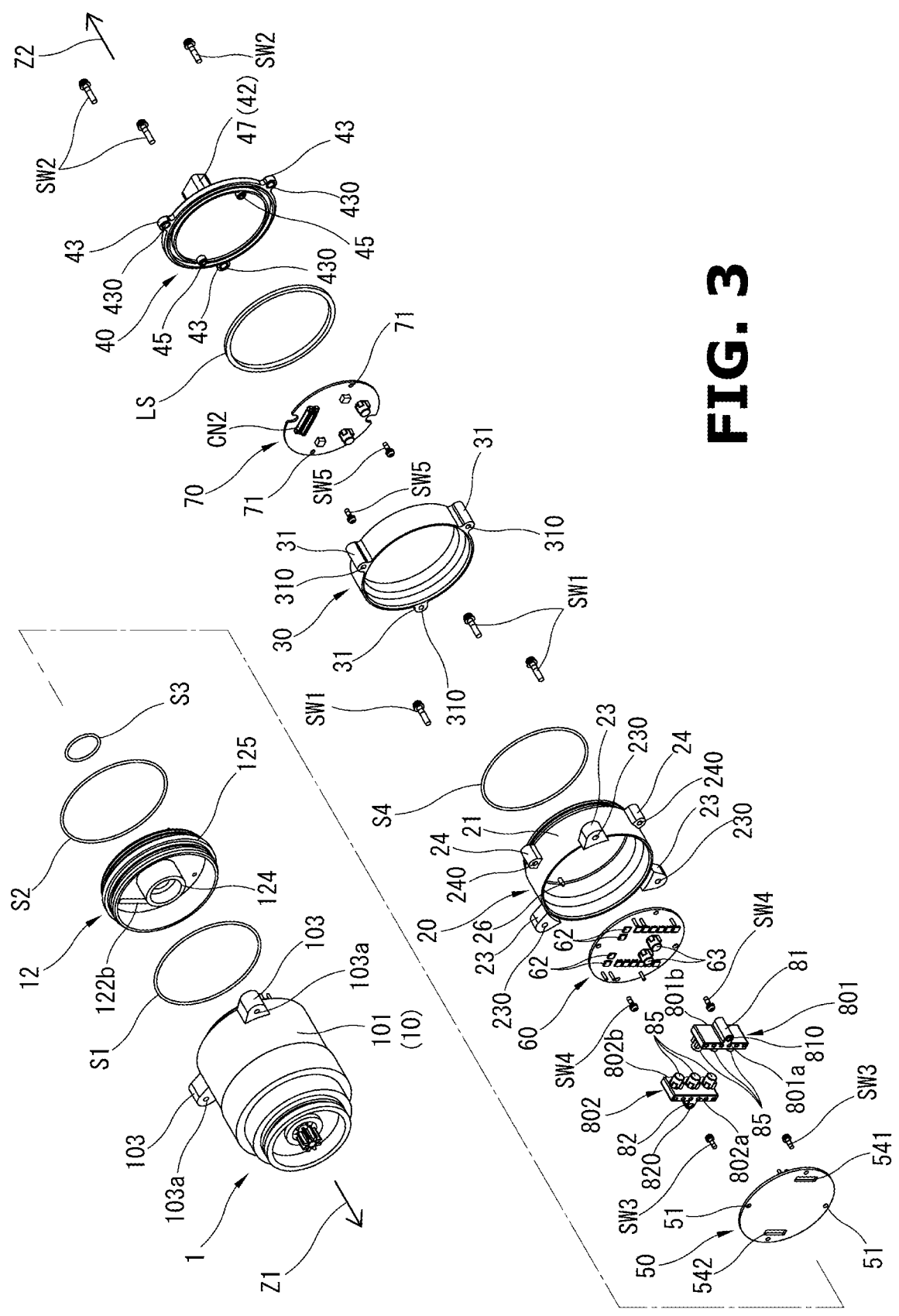
FIG. 3 is an exploded perspective view of the electronic control device according to the first embodiment of the present invention as viewed from a motor side.
Figure 4:
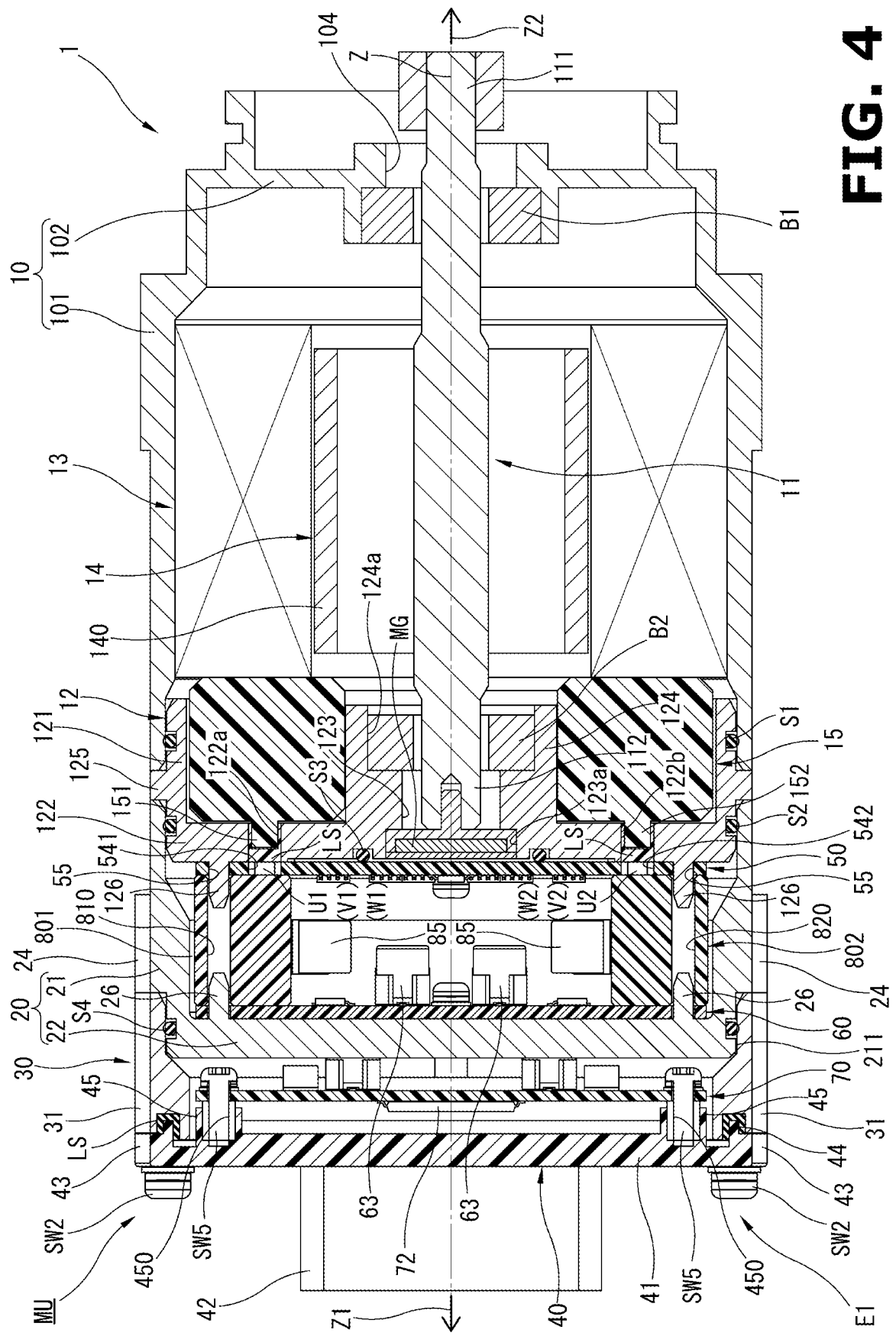
FIG. 4 is a longitudinal sectional view of the electronic control device taken along an axis Z in FIG. 2.

FIG. 2 shows an exploded perspective view of the motor unit MU including the electronic control device E1 according to the present embodiment as viewed from a cover 40 side. FIG. 3 shows an exploded perspective view of the motor unit MU including the electronic control device E1 according to the present embodiment as viewed from a motor 1 side. FIG. 4 shows a longitudinal sectional view of the motor unit MU taken along the axis Z in FIG. 2. For convenience of description about FIGS. 2 to 4, in the axial direction, the side on which the motor 1 is arranged is referred to as "first end side Z1", and the side on which the electronic control device E1 is arranged is referred to as "second end side Z2".

As shown in FIGS. 2 to 4, the motor 1 includes: a first housing 10 that is a motor housing formed in a generally cylindrical shape having a second end side Z2 opening; motor components (a stator 13 and a rotor 14) accommodated in the first housing 10; and the motor rotating shaft 11 that is rotationally driven by the motor components. The motor 1 is a three-phase motor such as a three-phase AC brushless motor, and is structured to be rotated by the motor components, and thereby apply an assist torque to the steering shaft, the rack shaft, etc. of the power steering device not shown through the speed reduction mechanism not shown linked to the first end part 111 of the motor rotating shaft 11.

The first housing 10 is made of a metal material with relatively high heat dissipation, such as an aluminum alloy material, and is formed into a bottomed cylindrical shape. The first housing 10 is formed integrally of a first housing tubular part 101 and a first housing end wall part 102. The first housing tubular part 101 is generally cylindrically shaped and accommodates the motor components. The first housing end wall part 102 encloses the first end side Z1 of the first housing tubular part 101. The first housing 10 has a plurality of (three in this embodiment) first housing flange parts 103 formed in the outer periphery of the second end side Z2 opening of the first housing tubular part 101, and arranged at predetermined positions in the circumferential direction, and projecting radially outward. The first housing 10 is connected to a second housing 20 via the first housing flange parts 103. A first shaft through hole 104 is formed in a central portion of the first housing end wall part 102, and extends therethrough in the axial direction, wherein the first end part 111 of the motor rotating shaft 11 extends through the first shaft through hole 104. A first bearing B1 is provided in the first shaft through hole 104 so as to support the first end part 111 of the motor rotating shaft 11 rotatably.

The motor components include: the stator 13 fitted with the first housing tubular part 101, and configured by winding coils (three-phase windings of U-phase, V-phase, and W-phase) around an iron core (teeth); and the rotor 14 cylindrically shaped, rotatably accommodated radially inside the stator 13 with a predetermined gap, and configured such that a plurality of permanent magnets 140 are arranged on the outer periphery of the rotor 14 with their magnetic poles varying alternately in the circumferential direction. The motor rotating shaft 11 is fixed to the inner periphery of the rotor 14 by press fitting, so that the rotor 14 and the motor rotating shaft 11 can rotate as a solid unit. The first end part 111 of the motor rotating shaft 11 extends from the rotor 14 toward the first end side Z1, and serves as an output section that outputs an assist torque via the speed reduction mechanism not shown linked to the first end part 111. On the other hand, a second end part 112 of the motor rotating shaft 11 extends toward the second end side Z2, and serves as a rotation sensing section for sensing the rotational position (rotation angle) of the motor rotating shaft 11 via a magnet MG mounted to the second end part 112.

A bearing holder 12 is fitted to the second end side Z2 opening of the first housing 10, and structured to hold a second bearing B2 on the inner periphery of the bearing holder 12. The second bearing B2 supports the second end 112 of the motor rotating shaft 11 rotatably. In the axial direction, the bearing holder 12 extends and overlaps with the first housing 10 and the second housing 20 described below facing the first housing 10. The first end side Z1 portion of the bearing holder 12 is fitted to the first housing 10, and the second end side Z2 portion of the bearing holder 12 is fitted to the second housing 20.

In the present embodiment, by screwing the first housing 10 and the second housing 20 together, the bearing holder 12 is also fixed to the second housing 20 as described below. However, this structure is unnecessary. Instead of being fixed by the fastening force between the first housing 10 and the second housing 20, the bearing holder 12 may be fixed to the first housing 10 and the second housing 20 by swaging. Specifically, a section where the bearing holder 12 is fitted to and overlaps with the first and second housings 10 and 20 may be swaged for fixation by crimping a plurality of portions (for example, three portions) of the outer periphery arranged in the circumferential direction.

Specifically, the bearing holder 12 is generally formed in a bottomed cylindrical shape, and includes: a holder tubular part 121 formed in a substantially cylindrical shape; and a holder end wall part 122 enclosing the second end side Z2 of the holder tubular part 121. A second shaft through hole 123 is formed in a central portion of the holder end wall part 122 to extend therethrough in the axial direction so that the second end part 112 of the motor rotating shaft 11 faces toward the second end side Z2 through the second shaft through hole 123. A boss part 124 is formed in a cylindrical shape at the first end side Z1 periphery of the second shaft through hole 123, and projects in the axial direction toward the first end side Z1. The inner periphery of the boss part 124 is formed with a bearing-holding portion 124*a* whose diameter increases stepwise toward the second end side Z2. A second bearing B2 is press-fitted inside the bearing-holding portion 124*a*.

The holder tubular part 121 is formed with an annular holder flange part 125 projecting radially outward, wherein the first housing 10 and the second housing 20 described below abut on the holder flange portion 125 from both sides in the axial direction. Furthermore, the outer periphery of the holder cylindrical portion 121 is formed with annularly-shaped seal receiving grooves on respective opposite sides of the holder flange part 125 in the axial direction. A first seal member S1 is accommodated in a seal accommodation groove on the first end side Z1 of the holder flange portion 125, and a second seal member S2 is accommodated in a seal accommodation groove on the second end side Z2 of the holder flange portion 125. Accordingly, the first seal member S1 elastically abuts on the first housing 10 to liquid-tightly seal between the first housing 10 and the bearing holder 12. Similarly, the second seal member S2 elastically abuts on the second housing 20 to liquid-tightly seal between the second housing 20 and the bearing holder 12.

As another embodiment for the configuration that the bearing holder 12 is swaged and fixed to the first and second housings 10 and 20 as described above, a liquid curable resin (for example, FIPG: Formed In Place Gasket) may be used instead of the first and second seal members S1 and S2 so as to liquid-tightly seal between the bearing holder 12 and the first and second housings 10 and 20.

A bus bar mold 15 is accommodated radially inside the holder tubular part 121 and between the holder tubular part 121 and the boss part 124, wherein a bus bar not shown is embedded in the bus bar mold 15 by resin molding for supplying electric power to each phase coil. The bus bar mold 15 is formed in a generally annular shape, and has an end face on the second end side Z2 which is formed with a first terminal mold part 151 and a second terminal mold part 152 projecting from the end face, wherein the first terminal mold part 151 and the second terminal mold part 152 are arranged to extend straight in parallel with each other with the rotational axis Z of the motor rotation shaft 11 interposed therebetween.

The first terminal mold part 151 is structured to face the second housing 20 through a first through hole 122*a* formed in the holder end wall part 122, wherein the first through hole 122*a* has a slot shape and extends through the holder end wall part 122 in the axial direction. The second terminal mold part 152 is structured to face the second housing 20 through a second through hole 122*b* formed in the holder end wall part 122, wherein the second through hole 122*b* has a slot shape and extends through the end wall part 122 in the axial direction. From the first terminal mold part 151, a first U-phase terminal U1, a first V-phase terminal V1, and a first W-phase terminal W1, which are first winding terminals for U-phase, V-phase, and W-phase, project in the axial direction toward the second end side Z2. Similarly, from the second terminal mold part 152, a second U-phase terminal U2, a second V-phase terminal V2, and a second W-phase terminal W2, which are second winding terminals for U-phase, V-phase, and W-phase, are project in the axial direction toward the second end side Z2.

The first through hole 122*a* is filled with a liquid seal LS between the first terminal mold part 151, the first U-phase terminal U1, the first V-phase terminal V1, and the first W-phase terminal W1. The liquid seal LS serves to liquid-tightly seal between the first through hole 122*a* and the first terminal mold part 151, the first U-phase terminal U1, the first V-phase terminal V1, and the first W-phase terminal W1. Similarly, the second through hole 122*b* is filled with a liquid seal LS between the second terminal mold part 152, the second U-phase terminal U2, the second V-phase terminal V2, and the second W-phase terminal W2. The liquid seal LS serves to liquid-tightly seal between the second through hole 122*b* and the second terminal mold part 152, the second U-phase terminal U2, the second V-phase terminal V2, and the second W-phase terminal W2.

The holder end wall part 122 is formed with a magnet accommodation portion 123*a* at the second end side Z2 of the second shaft through hole 123 for accommodating the magnet MG, wherein the magnet accommodation portion 123*a* increases in diameter in a stepwise manner toward the second end side Z2. Furthermore, the holder end wall part 122 is formed with an annular seal groove in the second end side Z2 face of the holder end wall part 122 facing a first board 50 described below, wherein the annular seal groove is formed in the outer periphery of the magnet accommodation portion 123*a*, and has a U-shaped cross section. This seal groove accommodates a third seal member S3. The third sealing member S3 elastically abuts on the first board 50, and thereby liquid-tightly seals between the holder end wall part 122 and the first board 50.

Furthermore, the second end side Z2 face of the holder end wall part 122 is formed with first connecting projections 126, 126 for connection with a connection member 80 described below, wherein the first connecting projections 126, 126 are located radially outside the first and second through holes 122*a* and 122*b*, and project in the axial direction. The first connecting projections 126, 126 are formed integrally with the first housing end wall part 102, and extend through first projection through holes 55, 55, respectively, wherein each first projection through hole 55 is formed to extend through the first board 50. Thus, the first board 50 is fixed or positioned. Each first connecting projection 126, 126 is formed to have a substantially circular cross section, and have a distal end part having a conical shape tapered toward a distal end.

The electronic control device E1 is formed in a substantially cylindrical shape having an outer diameter substantially the same as that of the motor 1, and is connected to the second end side Z2 of the motor 1. Specifically, the electronic control device E1 includes: the first board 50 and a second board 60, which are circuit boards housed inside the second housing 20 fixed to the first housing 10 by screws; a third board 70, which is a circuit board connected to the second end side Z2 of the housing 20 and accommodated inside a third housing 30; and a cover 40 attached to the second end side Z2 of the third housing 30.

The second housing 20 is made of a metal material with relatively high heat dissipation, such as an aluminum alloy material, and is formed in a bottomed cylindrical shape. The second housing 20 includes a second housing tubular part 21 and a second housing division wall part 22 which are integrally formed, wherein the second housing tubular part 21 is generally cylindrically shaped to have an opening on the first end side Z1, and wherein the second housing division wall part 22 encloses the second end side Z2 of the second housing tubular part 21.

The outer periphery of the first end side Z1 opening of the second housing tubular part 21 is formed with a plurality of (three in this embodiment) second housing first flange parts 23 at circumferential positions corresponding to the first housing flange parts 103, wherein each second housing first flange part 23 projects radially outward, and wherein the second housing tubular part 21 is connected to the first housing 10 via the second housing first flange parts 23. Specifically, the second housing 20 is fixed to the first housing 10 by screwing first screws SW1 into respective internal thread holes 103*a* formed in the respective first housing flange parts 103, via respective through holes 230 formed through the respective second housing first flange parts 23.

The outer periphery of the second end side Z2 opening of the second housing tubular part 21 is formed with a plurality (three in the present embodiment) of second housing second flange parts 24 at circumferential positions corresponding to third housing flange parts 31 of the third housing 30 described below, wherein each second housing second flange part 24 projects radially outward, and wherein the second housing tubular part 21 is connected to the third housing 30 via the second housing second flange parts 24. Specifically, the third housing 30 is fixed to the second housing 20 by screwing second screws SW2 into respective internal thread holes 240 formed in the respective second housing second flange parts 24, through the respective third housing flange parts 31 of the third housing 30.

The first end side Z1 portion of the second housing tubular part 21 is generally flat with a substantially constant outer diameter, whereas the second end side Z2 portion of the second housing tubular part 21 is formed with a second housing diameter-reduced portion 211 having a diameter decreasing stepwise. The second housing diameter-reduced portion 211 has an outer diameter that allows the second housing diameter-reduced portion 211 to be fitted to the inner peripheral surface of the first end side Z1 portion of the third housing 30. Furthermore, the outer periphery of the second housing diameter-reduced portion 211 is formed with an annular seal accommodating groove continuous in the circumferential direction. The seal accommodating groove accommodates a fourth seal member S4. Specifically, the fourth seal member S4 elastically abuts on the inner peripheral surface of the third housing 30, and thereby liquid-tightly seals between the second housing 20 and the third housing 30.

The second housing division wall part 22 is formed relatively thick, and the first end side Z1 face of the second housing division wall part 22 is formed with second connecting projections 26, 26 similar to the first connecting projections 126, 126, wherein the second connecting projections 26, 26 project in the axial direction, and are positioned to face the respective first connecting projections 126, 126. The second connecting projections 26, 26 are formed integrally with the second housing division wall part 22, and extend through second projection through holes 66, 66 formed through the second board 60, respectively, thereby fixing or positioning the second board 60. Each second connecting projection 26, 26 is formed to have a substantially circular cross section, and have a distal end part having a conical shape tapered toward a distal end, similarly to the first connecting projections 126, 126. Furthermore, the second board 60 is placed in contact with the second housing division wall part 22, so that the second housing division wall part 22 also functions as a so-called heat sink for dissipating the heat of the second board 60.

The third housing 30 is made of a metal material with relatively high heat dissipation, such as an aluminum alloy material, and is formed in a generally cylindrical shape with openings on its both sides in the axial direction. The outer periphery of the third housing 30 is formed with the third housing flange parts 31 projecting radially outward, wherein the third housing flange part 31 serves for fixation to the second housing 20. Each third housing flange part 31 is formed with a through hole 310 through which the second screw SW2 extends. The third housing 30 is fixed to the second housing 20 by screwing the second screws SW2 into the respective second housing second flange parts 24 via the respective through holes 310.

Furthermore, the second end side Z2 end face of the third housing 30 is formed with a fitting groove 32, wherein the fitting groove 32 has an annular shape continuous in the circumferential direction, and wherein an annular projection 44 formed in the cover 40 described below can be fitted in the fitting groove 32. The fitting groove 32 has a sufficiently larger width than the annular projection 44 of the cover 40. The fitting groove 32 is filled with a liquid seal LS between the fitting groove 32 and the annular projection 44 of the cover 40. Namely, the liquid seal LS allows liquid-tight sealing between the fitting groove 32 of the third housing 30 and the annular projection 44 of the cover 40.

The cover 40 is integrally formed of a synthetic resin material, and is generally formed in a disk shape. The cover 40 includes: a cover part 41 enclosing the second end side Z2 opening of the third housing 30; and a connector part 42 formed to project from the second end side Z2 of the cover part 41 and serve for connection between a terminal not shown provided on the third board 70 and an external device not shown. The cover 40 is fastened to the second housing 20 together with the third housing 30 via a plurality of (three in this embodiment) cover flange parts 43 formed in the outer periphery of the cover part 41. Specifically, each cover flange part 43 is formed with a through hole 430 through which the second screws SW2 can pass. The cover 40 is fastened to the second housing 20 together with the third housing 30 by screwing the second screws SW2 into the respective internal thread holes 103a of the second housing second flange parts 24 through the respective through holes 430 of the cover flange parts 43 and through the respective through holes 310 of the third housing flange parts 31.

The first end side Z1 face of the cover part 41 is formed with the annular projection 44 that projects toward the first end side Z1 and is arranged to be fitted in the fitting groove 32 of the third housing 30. The annular projection 44 is set to have dimensions slightly smaller than the width and depth of the fitting groove 32 of the third housing 30. Specifically, the annular projection 44 has a slight gap with the fitting groove 32 when the annular projection 44 is engaged with the fitting groove 32 of the third housing 30. This gap is filled with a liquid seal LS. This serves for liquid-tight sealing between the annular projection 44 and the fitting groove 32 of the third housing 30.

Furthermore, the first end side Z1 face of the cover part 41 is formed with a pair of board-mounting parts 45, 45 that is disposed radially inside the annular projection 44, and located symmetrically with respect to the rotational axis Z of the motor rotation shaft 11, and project to face the third board 70 for fixation of the third board 70. The board-mounting parts 45, 45 each have a substantially cylindrical shape, and are formed with internal thread portions 450, 450 therein, wherein fifth screws SW5 pass through the third board 70 and are screwed into the internal thread portions 450, 450. Specifically, the third board 70 is fixed to the cover part 41 by screwing the fifth screws SW5 into the internal thread portions 450, 450 of the board-mounting parts 45, 45 through the third board 70.

The external connector part 42 is a male connector that faces the outside through terminal through holes not shown formed through the cover part 41, and surrounds terminals not shown provided on the third board 70, and is connected to an external device. The external connector part 42 includes three generally rectangular connector portions, namely, a first connector portion 46, a second connector portion 47, and a third connector portion 48, each of which is configured to be connected to an electric power supply (vehicle battery), another electronic control device, etc. via a female connector not shown. Accordingly, electric power is supplied to the electronic control device E1 from an external battery power supply, and sensing signals such as sensing signals indicative of a vehicle driving state can be inputted from external sensors to the electronic control device E1, whereas the electronic control device E1 can output a signal of control status of the power steering device to an electronic control device (ECU) on the vehicle side.

The first board 50 is a circuit board made of a resin material such as glass epoxy resin, and functions mainly as a power conversion section. The first board 50 is fixed to the bearing holder 12 via a pair of first board through holes 51, 51 formed through the outer peripheral portion of the first board 50. Specifically, the first board 50 is fixed to the bearing holder 12 by screwing the third screws SW3 into respective holder internal thread holes 127, 127 of the bearing holder 12 through the respective first board through holes 51, 51.

On the second end side Z2 face of the first board 50, switching elements such as a motor relay FET 52 are arranged line-symmetrically with respect to a reference line Y passing through the rotational axis Z of the motor rotation shaft 11, wherein the switching elements constitute a power conversion circuit section based on a redundant system. This allows one of power conversion circuit parts to continue a steering assist control even if the other power conversion circuit part fails, and thereby ensures a highly sustainable steering assist control.

Furthermore, the first board 50 is formed with a first three phase terminals through hole 541 and a second three phase terminals through hole 542 located to be symmetrical with respect to the reference line Y. The first three phase terminals through hole 541 has a slot shape through which the first U-phase terminal U1, the first V-phase terminal V1, and the first W-phase terminal W1 extend. The second three phase terminals through hole 542 has a slot shape through which the second U-phase terminal U2, the second V-phase terminal V2, and the second W-phase terminal W2 extend. Specifically, the first U-phase terminal U1, the first V-phase terminal V1, and the first W-phase terminal W1 extend from the motor 1 side through the first three phase terminals through hole 541 to face the second board 60, and the second three-phase, the second U-phase terminal U2, the second V-phase terminal V2, and the second W-phase terminal W2 extend from the motor 1 side through the second three phase terminals through hole 542 to face the second board 60.

Furthermore, a set of a first battery power terminal Vb1, a first inverter power terminal Vi1, and a first GND terminal G1, and a set of a second battery power terminal Vb2, a second inverter power terminal Vi2, and a second GND terminal G2 are arranged to be line-symmetrical with respect to the reference line Y, and soldered to the second end side Z2 face of the first board 50, wherein these terminals are electrically connected to switching elements such as the motor relay FET 52 through a pattern circuit not shown provided on the first board 50. The first battery power terminal Vb1, the first inverter power terminal Vi1, and the first GND terminal G1 are aligned with the first U-phase terminal U1, the first V-phase terminal V1, and the first W-phase terminal W1, which face the second board 60 from the motor 1 side through the first three phase terminals through hole 541. Similarly, the second battery power terminal Vb2, the second inverter power terminal Vi2, and the second GND terminal G2 are aligned with the second U-phase terminal U2, the second V-phase terminal V2, and the second W-phase terminal W2, which face the second board 60 from the motor 1 side via the second three phase terminals through hole 542.

Furthermore, a central portion of the first board 50 is provided with rotation angle sensors RE that are mounted on the first end side Z1 and the second end side Z2 of the first board 50, respectively. The rotational angle sensors RE sense the rotational phase and rotational speed of the motor rotation shaft 11 by cooperating with the magnet MG mounted to the motor rotation shaft 11 which constitutes a rotation sensing section. Waterproof coating is applied to the rotational angle sensors RE, for protecting the rotational angle sensor RE from moisture entering the electronic control device E1 through the inside of the motor 1.

In addition, it is desirable that the first end side Z1 face of the first board 50 is coated with a copper foil capable of absorbing moisture. This serves to protect the first board 50 from moisture that has entered the electronic control device E1 side through the inside of the motor 1. The protection of the first board 50 from moisture entering through the inside of the motor 1 may be implemented by coating the first end side Z1 face with a copper foil as described above, or by forming the first board 50 itself from a ceramic board excellent in waterproof performance.

The second board 60 is a circuit board made of a resin material such as glass epoxy resin, and functions mainly as a power supply circuit section. The second board 60 is fixed to the second housing division wall part 22 of the second housing 20 via a pair of second board through holes 61, 61 formed through the outer peripheral portion of the second board 60. Specifically, the second board 60 is fixed with the second end side Z2 face of the second board 60 in contact with the second housing division wall part 22, by screwing fourth screws SW4 into respective division wall internal thread holes 25, 25 of the second housing division wall part 22 through the second board through holes 61, 61.

On the first end side Z1 face of the second board 60, electronic components such as a power relay FET 62 and an electrolytic capacitor 63 are arranged line-symmetrically with respect to a reference line Y passing through the rotational axis Z of the motor rotation shaft 11, wherein the electronic components constitute a power supply circuit section based on a redundant system. This allows one of power supply circuit parts to continue a steering assist control even if the other power supply circuit part fails, and thereby ensures a highly sustainable steering assist control.

Furthermore, a first battery power terminal Vb1, a first inverter power terminal Vi1, and a first GND terminal G1 are soldered to the first end side Z1 face of the second board 60, wherein the first battery power terminal Vb1, the first inverter power terminal Vi1, and the first GND terminal G1 are electrically connected to electronic components such as a power relay FET 62 and an electrolytic capacitor 63 via a pattern circuit not shown provided on the second board 60, and located to correspond in position to the first battery power terminal Vb1, the first inverter power terminal Vi1, and the first GND terminal G1 of the first board 50. Similarly, a second battery power terminal Vb2, a second inverter power terminal Vi2, and a second GND terminal G2 are soldered to the first end side Z1 face of the second board 60, wherein the second battery power terminal Vb2, the second inverter power terminal Vi2, and the second GND terminal G2 are electrically connected to electronic components such as a power relay FET 62 and an electrolytic capacitor 63 via a pattern circuit not shown provided on the second board 60, and located to correspond in position to the second battery power terminal Vb2, the second inverter power terminal Vi2, and the second GND terminal G2 of the first board 50.

The first board 50 and the second board 60 are connected to each other via a pair of connection members, i.e. a first connection member 801 and a second connection member 802. Each of the first connection member 801 and the second connection member 802 is formed of a resin material in a substantially rectangular block shape identical to each other. The first connection member 801 and the second connection member 802 are sandwiched between the first board 50 and the second board 60, and connect the first board 50 and the second board 60 with a certain constant axial distance equal to the height of the first connection member 801 and the second connection member 802.

Each of the first connection member 801 and the second connection member 802 has a back face formed with a respective one of a first mounting base part 81 and a second mounting base part 82 projecting from the back face. The first connection member 801 and the second connection member 802 are physically connected to the first board 50 and the second board 60 via the first mounting base part 81 and the second mounting base part 82. Specifically, each of the first mounting base part 81 and the second mounting base part 82 is formed with a respective one of a first fitting hole 810 and a second fitting hole 820 that extends therethrough in the axial direction. The first connecting projections 126, 126 extending through the first board 50 and the second connecting projections 26, 26 extending through the second board 60 are fitted in the first fitting hole 810 and the second fitting hole 820, thereby connecting the first board 50 and the second board 60 physically.

Figure 5:
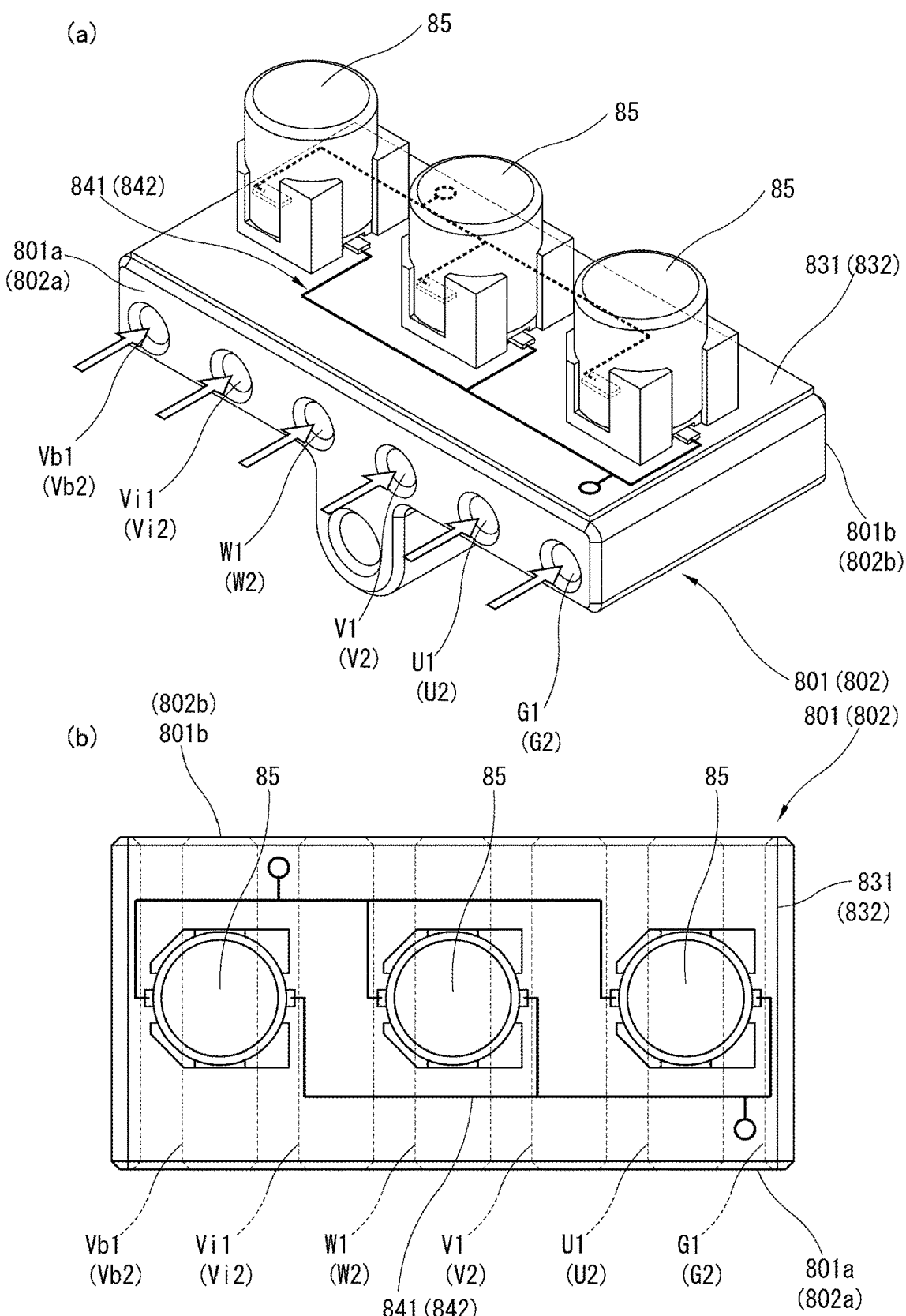
FIG. 5 shows views of a connection member shown in FIG. 2, where (a) is a perspective view, and (b) is a plan view.

As shown in FIGS. 4 and 5, the first connection member 801 is formed with a first battery power terminal hole HVb1, a first inverter power terminal hole HVi1, a first U-phase terminal hole HU1, a first V-phase terminal hole HV1, a first W-phase terminal hole HW1, and a first GND terminal hole HG1, each of which opens in first and second end faces 801*a* and 801*b* of the first connection member 801. Similarly, the second connection member 802 is formed with a second battery power terminal hole HVb2, a second inverter power terminal hole HVi2, a second U-phase terminal hole HU2, a second V-phase terminal hole HV2, a second W-phase terminal hole HW2, and a second GND terminal hole HG2, each of which opens in first and second end faces 802*a* and 802*b* of the second connection member 802.

The first battery power terminal Vb1, the first inverter power terminal Vi1, the first U-phase terminal U1, the first V-phase terminal V1, the first W-phase terminal W1, and the first GND terminal G1 that extend from the first board 50 side are connected to the first battery power terminal hole HVb1, the first inverter power terminal hole HVi1, the first U-phase terminal hole HU1, the first V-phase terminal hole HV1, and the first W-phase terminal hole HW1, and the first GND terminal hole HG1 on the first end face 801*a* side of the first connection member 801. The first battery power terminal Vb1, the first inverter power terminal Vi1, and the first GND terminal G1 that extend from the second board 60 side are connected to the first battery power terminal hole HVb1, the first inverter power terminal hole HVi1, and the first GND terminal hole HG1 on the second end face 801*b* side of the first connection member 801. Similarly, the second battery power terminal Vb2, the second inverter power terminal Vi2, the second U-phase terminal U2, the second V-phase terminal V2, the second W-phase terminal W2, and the second GND terminal hole HG2 that extend from the first board 50 side are connected to the second battery power terminal hole HVb2, the second inverter power terminal hole HVi2, the second U-phase terminal hole HU2, the second V-phase terminal hole HV2, the second W-phase terminal hole HW2, and the second GND terminal hole HG2 on the first end face 802*a* side of the second connection member 802. The second battery power terminal Vb2, the second inverter power terminal Vi2, and the second GND terminal G2 that extend from the second board 60 side are connected to the second battery power terminal hole HVb2, the second inverter power terminal hole HVi2, and the second GND terminal hole HG2 on the second end face 802*b* side of the second connection member 802. Thereby, the first board 50 and the second board 60 are electrically connected to each other via the first connection member 801 and the second connection member 802.

Furthermore, a first capacitor board 831 is arranged on an inner face of the first connection member 801 that is perpendicular to the first connection member 801 and faces the rotational axis Z. A pattern circuit 841 is formed on the first capacitor board 831, and connects the first inverter power supply terminal Vi1 and the first GND terminal G1. Three electrolytic capacitors 85 are arranged in the pattern circuit 841, and aligned in the width direction of the first connection member 801 (see FIG. 5). Similarly, a second capacitor board 832 is arranged on an inner face of the second connection member 802 that faces the rotational axis Z. A pattern circuit 842 is formed on the second capacitor board 832, and connects the second inverter power supply terminal Vi2 and the second GND terminal G2, wherein three electrolytic capacitors 85 are arranged in the pattern circuit 842 (see FIG. 5).

In this embodiment, the pattern circuits 841 and 842 are entirely formed on the surfaces of the first and second capacitor boards 831 and 832, respectively. However, it is not limited to this configuration, and for example, the pattern circuits 841 and 842 may be formed partly on the back faces of the first and second capacitor boards 831 and 832. This serves to effectively use the surfaces of the first and second capacitor boards 831 and 832, and thereby improve the flexibility of layout of the electrolytic capacitors 85, and allow the first and second capacitor boards 831 and 832 to be further downsized.

The third board 70 is a circuit board made of a resin material such as glass epoxy resin, and functions mainly as a control circuit section. The third board 70 is fixed to the cover part 41 of the cover 40 via a pair of third board through holes 71, 71 formed through the outer peripheral portion of the third board 70. Specifically, the third board 70 is fixed to the cover part 41 by screwing the fifth screws SW5 into the internal thread portions 450, 450 of the board-mounting parts 45, 45 formed in the cover part 41 through the third board through holes 71, 71.

Electronic components, such as an MPU 72 that is a microcomputer, are mounted to a generally central portion of the first end side Z1 face of the third board 70, and constitute a control circuit section. On the other hand, electronic components such as an electrolytic capacitor 73 are mounted on the second end side Z2 face of the third board 70.

Furthermore, a plurality of terminals not shown are soldered to the second end side Z2 face of the third board 70, and connected to pattern circuits not shown formed on both surfaces of the third board 70. The terminals not shown face the inside of the first connector part 46, the second connector part 47, and the third connector part 48 through terminal through holes not shown formed through the cover part 41, and are connected to an external device via female connectors not shown connected to the first to third connector parts 46 to 48.

The second board 60 and the third board 70 are electrically connected to each other via an internal connector CN that serves to supply electric power to the second board 60 and transmit and receive control signals to and from the second board 60. The internal connector CN includes: a second board side connector CN1 provided on the second end side Z2 face of the second board 60; and a third board side connector CN2 provided on the first end side Z1 face of the third board 70. The second board-side connector CN1 and the third board-side connector CN2 are connectable to each other through a connector communication hole 27 that is formed in a substantially rectangular shape and extends through the second housing division wall 22.

As described above, in the present embodiment, the internal connector CN is configured to supply electric power to the second board 60 and transmit and also receive control signals to and from the second board 60. However, the internal connector CN may be divided into a power supply connector and a signal transmission connector separate from each other.

Behavior and Effects of Present Embodiment

In the conventional electronic control device, the fixation of the second board requires to avoid interference with the bosses, and therefore form the second board to be partly notched. The notching causes a decrease in area of the second board for mounting. Therefore, in order to ensure a sufficient mounting area of the second board, the second board is required to be upsized. This may cause the electronic control device to be upsized.

On the other hand, the electronic control device E1 according to the present embodiment produces advantageous effects as follows, and thereby serves to solve the problems of the conventional electronic control device.

The electronic control device E1 is an electronic control device for driving and controlling the motor 1 having three-phase windings of U-phase, V-phase, and W-phase (coils not shown), which includes: a circuit board set to which an electronic component (for example, motor relay FET 52, rotational angle sensor RE, electrolytic capacitor 63, etc.) is mounted for driving and controlling the motor 1, wherein the circuit board set includes the first board 50 and the second board 60, and wherein the first board 50 and the second board 60 are opposed to each other; a first terminal set (first battery power terminal Vb1, first inverter power terminal Vi1, first U-phase terminal U1, first V-phase terminal V1, first W-phase terminal W1, and first GND terminal G1; or second battery power terminal Vb2, second inverter power terminal Vi2, second U-phase terminal U2, second V-phase terminal V2, second W-phase terminal W2, and second GND terminal G2, which extend from the first board 50 side) mounted to a first side of the first board 50 facing the second board 60, and employed for connection to the second board 60; a second terminal set (first battery power terminal Vb1, first inverter power terminal Vi1, and first GND terminal G1; or second battery power terminal Vb2, second inverter power terminal Vi2, and second GND terminal G2, which extend from the second board 60 side) mounted to a first side of the second board 60 facing the first board 50, and employed for connection to the first board 50; and the connection member 801, 802 disposed between the first board 50 and the second board 60, connected to the first terminal set and the second terminal set, and structured to maintain a constant distance between the first board 50 and the second board 60.

Thus, in this embodiment, by connecting the first board 50 and the second board 60 via the connection members 801 and 802, it is possible to fix the first board 50 and the second board 60 without adversely affecting the mounting area of the first board 50 and the second board 60. This serves to ensure a sufficient mounting area of the first board 50 and the second board 60, and thereby serve to downsize the electronic control device.

In this embodiment, the first board 50 is fixed to the motor 1 (bearing holder 12) by the third screws SW3, and the second board 60 is fixed to the second housing division wall part 22 by the fourth screws SW4. However, the first board 50 and the second board 60 can be fixed only by the connection members 801 and 802. This eliminates the necessity of fixing the first board 50 and the second board 60 with screws as in the conventional electronic control device, and serves to reduce the number of components to improve assembly workability and reduce manufacturing costs.

On the other hand, in the present embodiment, when the first board 50 is fixed to the motor 1 (bearing holder 12) by the third screws SW3, the first board 50 and the second board 60 can be fixed more firmly. This serves to improve the durability and reliability of the electronic control device E1.

Furthermore, in the present embodiment: the motor 1 includes the motor rotating shaft 11, wherein the motor rotating shaft 11 has the first end part 111 and the second end part 112 opposite to the first end part 111, wherein the first end part 111 outputs a driving force of the motor 1; the electronic control device E1 is arranged closer to the second end part 112 than to the first end part 111; and the first terminal set includes a terminal (first U-phase terminal U1, first V-phase terminal V1, and first W-phase terminal W1; or second U-phase terminal U2, second V-phase terminal V2, and second W-phase terminal W2) connected to the three-phase windings.

By thus connecting the first terminal set to the three-phase windings (the U-phase, V-phase, and W-phase coils), it is possible to form a module in which the motor 1 and the electronic control device E1 are integrated. This makes it easier to handle the motor 1 and the electronic control device E1 than when the motor 1 and the electronic control device E1 are mounted separately. Furthermore, by using such an integrated module, it is possible to shorten the length of the wire connecting the motor 1 and the electronic control device E1, and thereby serves to achieve a preferable drive control of the motor 1.

Furthermore, in the present embodiment, the connection member 801, 802 electrically connects the first terminal set (first battery power terminal Vb1, first inverter power terminal Vi1, first U-phase terminal U1, first V-phase terminal V1, first W-phase terminal W1, and first GND terminal G1; or second battery power terminal Vb2, second inverter power terminal Vi2, second U-phase terminal U2, second V-phase terminal V2, second W-phase terminal W2, and second GND terminal G2, which extend from the first board 50 side) and the second terminal set (first battery power terminal Vb1, first inverter power terminal Vi1, and first GND terminal G1; or second battery power terminal Vb2, second inverter power terminal Vi2, and second GND terminal G2, which extend from the second board 60 side) to each other.

Since the connection members 801 and 802 electrically connects the first terminal set (first inverter power supply terminal Vi1 or the like extending from the first board 50 side, or second inverter power supply terminal Vi2 or the like extending from the first board 50 side) and the second terminal set (second inverter power supply terminal Vi2 or the like extending from the second board 60 side) in this way, the connection members 801 and 802 serve both for physically connecting the first board 50 and the second board 60 and for electrically connecting the first board 50 and the second board 60. Thereby, the first board 50 and the second board 60 can be easily connected with a simple configuration employing the connection members 801 and 802.

The present embodiment includes: the first housing 10 accommodating at least a part of the motor 1; and the second housing 20 provided with the division wall (second housing division wall part 22) facing the second end part 112 of the motor rotating shaft 11, wherein the first board 50, the second board 60, and the connection member 801, 802 are accommodated in an internal space of the second housing 20 between the division wall (second housing division wall part 22) and the motor 1; wherein a second side of the second board 60 opposite to the first side of the second board 60 facing the first board 50 abuts on the division wall (second housing division wall part 22).

The configuration that the second end side Z2 face of the second board 60 abuts on the second housing division wall part 22, serves to restrict by the second housing division wall part 22 movement of the second board 60 toward the second housing division wall part 22 (toward the second end side Z2), and thereby more stably accommodate the second board 60 in the second housing 20. The further feature that the second end side Z2 face of the second board 60 is in contact with the second housing division wall part 22, allows the second housing division wall part 22 to serve for heat dissipation from the second board 60.

The present embodiment includes: the bearing holder 12 extending in an axial direction of the motor rotating shaft 11 between the first housing 10 and the second housing 20, and fitted with the first housing 10 and the second housing 20; and the bearing (second bearing B2) held by the bearing holder 12, and structured to support the second end part 112 of the motor rotating shaft 11; wherein a second side of the first board 50 opposite to the first side of the first board 50 facing the second board 60 abuts on a face of the bearing holder 12 on the second end part 112 side of the motor rotating shaft 11.

By thus supporting the face of the second board 60 opposite to the first board 50 by the second housing division portion 22, and supporting the face of the first board 50 opposite to the second board 60 by the bearing holder 12 fitted to the housing 20, it is possible to sandwich the first board 50 and the second board 60 from both sides in the axial direction, wherein the first board 50 and the second board 60 are connected by the connection members 801 and 802. Thereby, the first board 50 and the second board 60 can be stably accommodated in the second housing 20.

The present embodiment includes: the magnet MG attached to the second end part 112 of the motor rotating shaft 11; and the rotational angle sensor RE mounted to the second side of the first board 50 opposite to the first side of the first board 50 facing the second board 60, arranged to correspond in position to the magnet MG, and structured to sense a rotational angle of the motor rotating shaft 11.

The configuration that the magnet MG is mounted to the second end part 112 of the motor rotating shaft 11, and the rotational angle sensor RE is mounted to the (first end side Z1) face of the first board 50 facing the magnet MG on the side opposite to the second board 60, allows the rotational angle sensor RE to be arranged in an optimum position, and serves to suitably sense the rotational phase and rotational angle of the motor rotating shaft 11.

In the present embodiment: the circuit board set further includes the third board 70; the control circuit part (MPU 72) is mounted to the third board 70, and has a main function of driving and controlling the motor 1; and the third board 70 is accommodated in the third housing 30 arranged at a side of the second housing 20 opposite to a side of the second housing 20 facing the first housing 10.

If a circuit board constituting a control circuit section is arranged closer to a motor as in the conventional electronic control device, the circuit board constituting the control circuit section is interposed between the motor and a circuit board constituting a power conversion circuit section such as an inverter. In this configuration, a relatively large electric current for driving and controlling the motor flows through the circuit board constituting the control circuit section which is interposed between the motor and the circuit board constituting the power conversion circuit section, so that a shielding structure is required to protect the circuit board constituting the control circuit section from electromagnetic influences.

On the other hand, in the present embodiment, the third board 70 constituting the control circuit section is arranged at the axial end opposite to the motor 1, and the third board 70 is not arranged between the motor 1 and the first board 50 and the second board 60 which constitute the power conversion circuit section. Accordingly, there is no possibility that a relatively large electric current for driving and controlling the motor 1 flows through the third board 70. Therefore, as compared with the conventional electronic control device where the circuit board constituting the control circuit section is arranged closer to the motor, the shielding structure can be omitted. This serves to simplify the structure of the electronic control device E1, and thereby reduce the number of components, and improve assembly workability. Naturally, these advantageous effects are produced not only by the configuration the third board 70 is accommodated in the third housing 30, but also by a configuration according to second and third embodiments described below in which the third board 70 is accommododated in the second housing 20 integrally formed.

The further configuration that the first board 50 and the second board 60 are accommodated in the second housing 20, and the third board 70 is accommodated in the third housing 30 connected to the second housing 20, serves to allow the first board 50, the second board 60, and the third board 70 to be integrally arranged. This serves to shorten the length of the wires connecting the boards 50, 60, 70, and thereby achieve a suitable drive control of the motor 1.

The present embodiment includes: the power supply terminal (first inverter power terminal Vi1, and second inverter power terminal Vi2) and the ground terminal (first GND terminal G1, and second GND terminal G2) provided to a side face of the connection member 801, 802, wherein the power supply terminal (first inverter power terminal Vi1, and second inverter power terminal Vi2) is branched from a power supply connected to the power conversion circuit section (switching elements such as motor relay FET 52) having a main function of driving the motor 1, and wherein the ground terminal (first GND terminal G1, and second GND terminal G2) is branched from a ground; and the capacitor (electrolytic capacitor 85) connected to the power supply terminal (first inverter power terminal Vi1, and second inverter power terminal Vi2) and the ground terminal (first GND terminal G1, and second GND terminal G2), and configured to rectify an electric current of the power conversion circuit section (switching elements such as motor relay FET 52).

The configuration that the rectifying electrolytic capacitor is arranged between the three-phase windings (U-phase, V-phase, and W-phase coils) of the motor 1 and the power conversion section (switching elements such as motor relay FET 52), serves to set the position of the capacitor (electrolytic capacitor 85) to be relatively close to the three-phase windings (U-phase, V-phase, and W-phase coils) of the motor 1 and the power conversion circuit (switching elements such as the motor relay FET 52). This serves to enhance the noise suppressing effect of the capacitor (electrolytic capacitor 85).

In the present embodiment, the capacitor (electrolytic capacitor 85) is arranged to be perpendicular to the connection member 801, 802.

The configuration that the electrolytic capacitor 85 is arranged between the first board 50 and the second board 60 so as to be perpendicular to the connection members 801 and 802, serves to effectively utilize the space formed between the first board 50 and the second board 60, and downsize the electronic control device E1.

Second Embodiment

Figure 6:
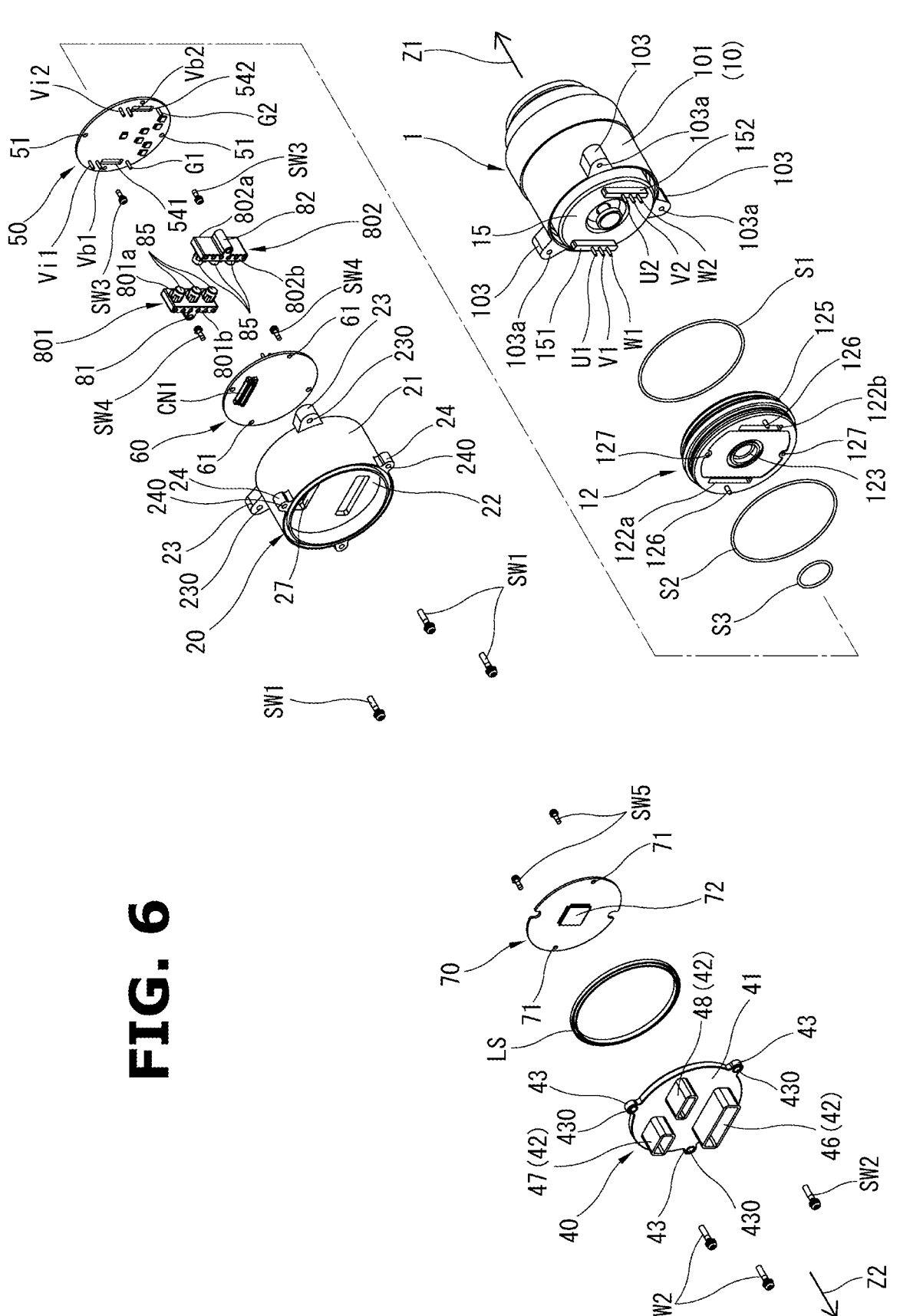
FIG. 6 is an exploded perspective view of an electronic control device according to a second embodiment of the present invention as viewed from a cover side.
Figure 7:
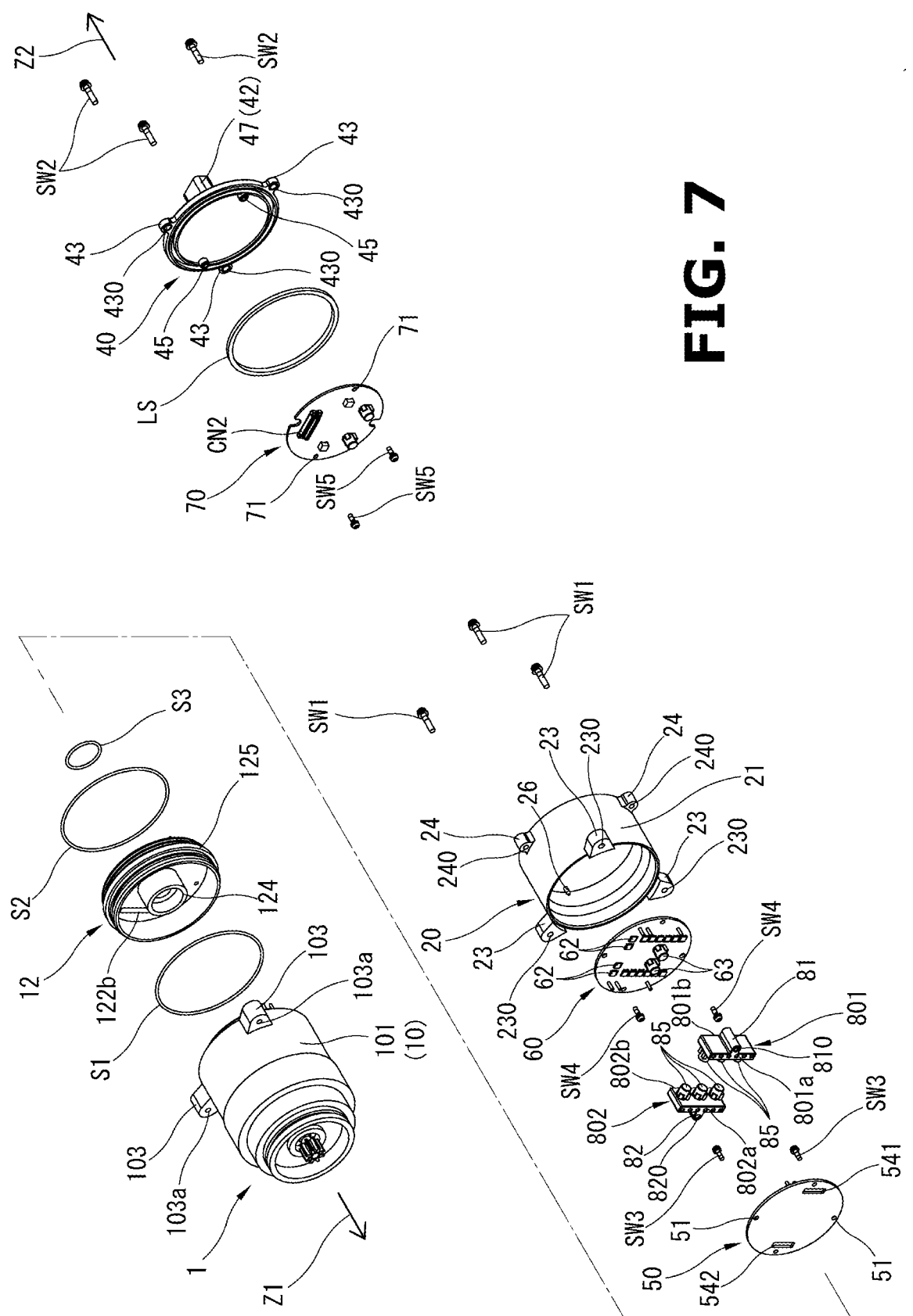
FIG. 7 is an exploded perspective view of the electronic control device according to the second embodiment of the present invention as viewed from a motor side.
Figure 8:
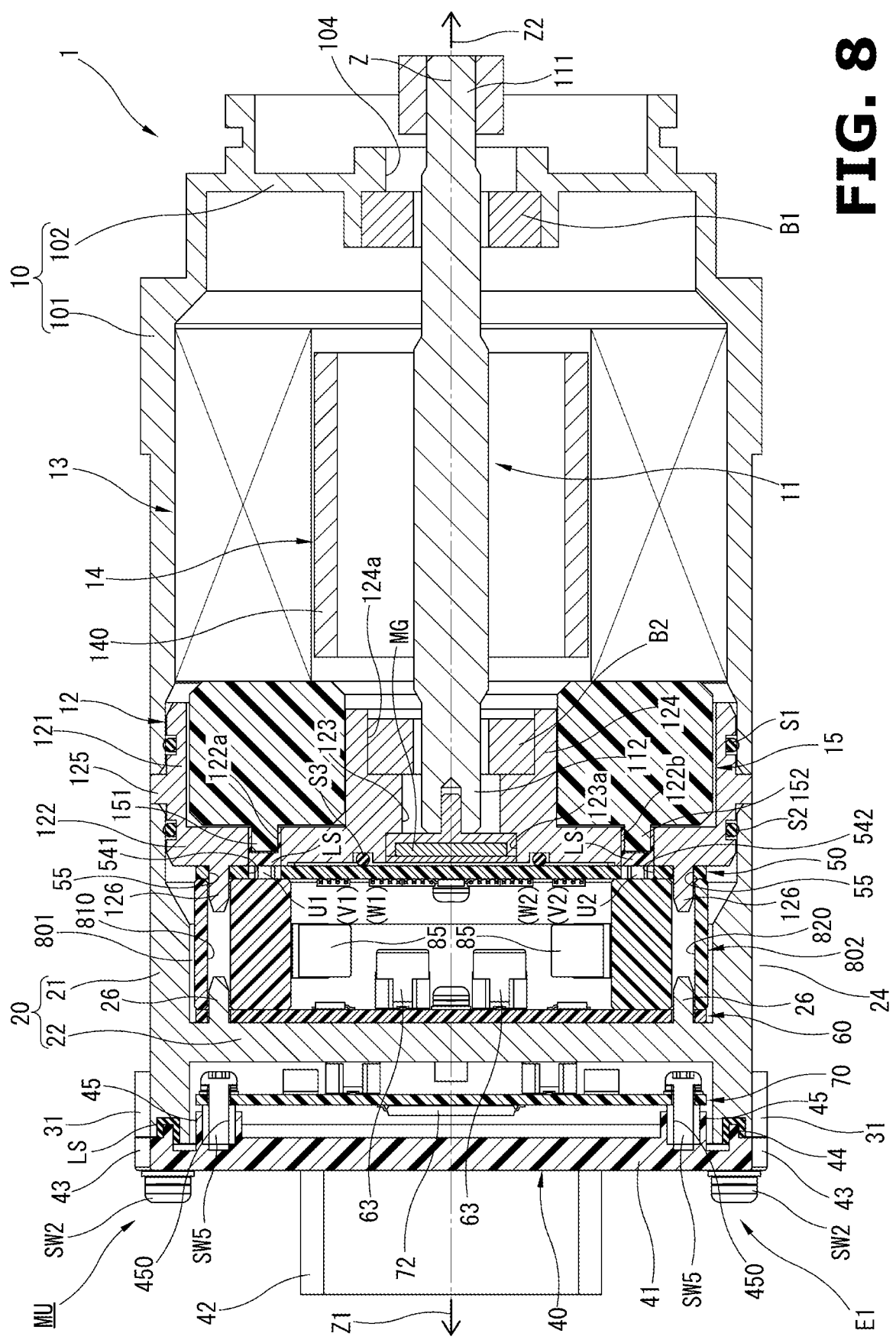
FIG. 8 is a longitudinal sectional view of the electronic control device taken along an axis Z in FIG. 6.

FIGS. 6 to 8 show an electronic control device according to a second embodiment of the present invention, in which the configuration of the second housing 20 and the third housing 30 of the electronic control device E1 according to the first embodiment is modified. Except for this modification, the second embodiment has the same basic configuration as the first embodiment. The same components as in the first embodiment are denoted by the same reference numerals, and description thereof is omitted.

FIG. 6 shows an exploded perspective view of a motor unit MU provided with an electronic control device E2 according to the present embodiment as viewed from the cover 40 side. FIG. 7 shows an exploded perspective view of the motor unit MU provided with the electronic control device E2 according to this embodiment as viewed from the motor 1 side. FIG. 8 shows a longitudinal sectional view of the motor unit MU taken along the axis Z in FIG. 6. For convenience of description about FIGS. 6 to 8, in the axial direction, the side on which the motor 1 is arranged is referred to as "first end side Z1", and the side on which the electronic control device E2 is arranged is referred to as "second end side Z2".

As shown in FIGS. 6 to 8, in the electronic control device E2 according to the present embodiment, the third housing 30 according to the first embodiment is integrally formed with the second housing 20 according to the first embodiment to form a modified second housing 20. As shown in FIG. 8, the second housing 20 is formed to have an H shape in longitudinal section.

This embodiment where the third housing 30 is modified from the first embodiment to be integrally formed to constitute the second housing 20, serves to reduce the number of components, such as the third housing 30 and the fourth seal member S4 according to the first embodiment, and thereby improve the assembly workability of the electronic control device E2.

Furthermore, the integral structure described above serves to eliminate the portion of separation between the second housing 20 and the third housing 30 according to the first embodiment, and thereby produce a further advantageous effect of suppressing the entry of moisture from the outside through the portion of separation.

Third Embodiment

Figure 9:
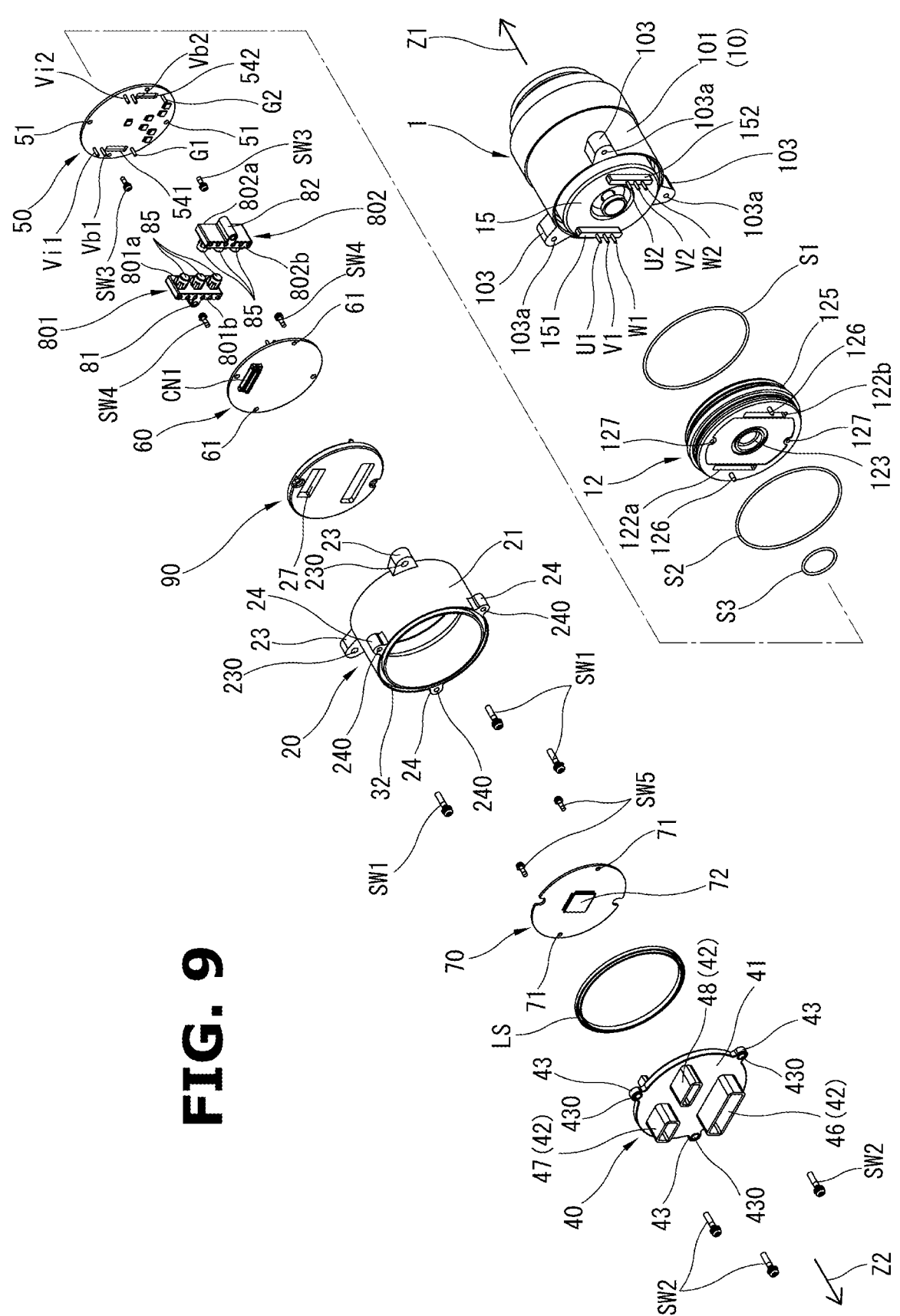
FIG. 9 is an exploded perspective view of an electronic control device according to a third embodiment of the present invention as viewed from a cover side.
Figure 10:
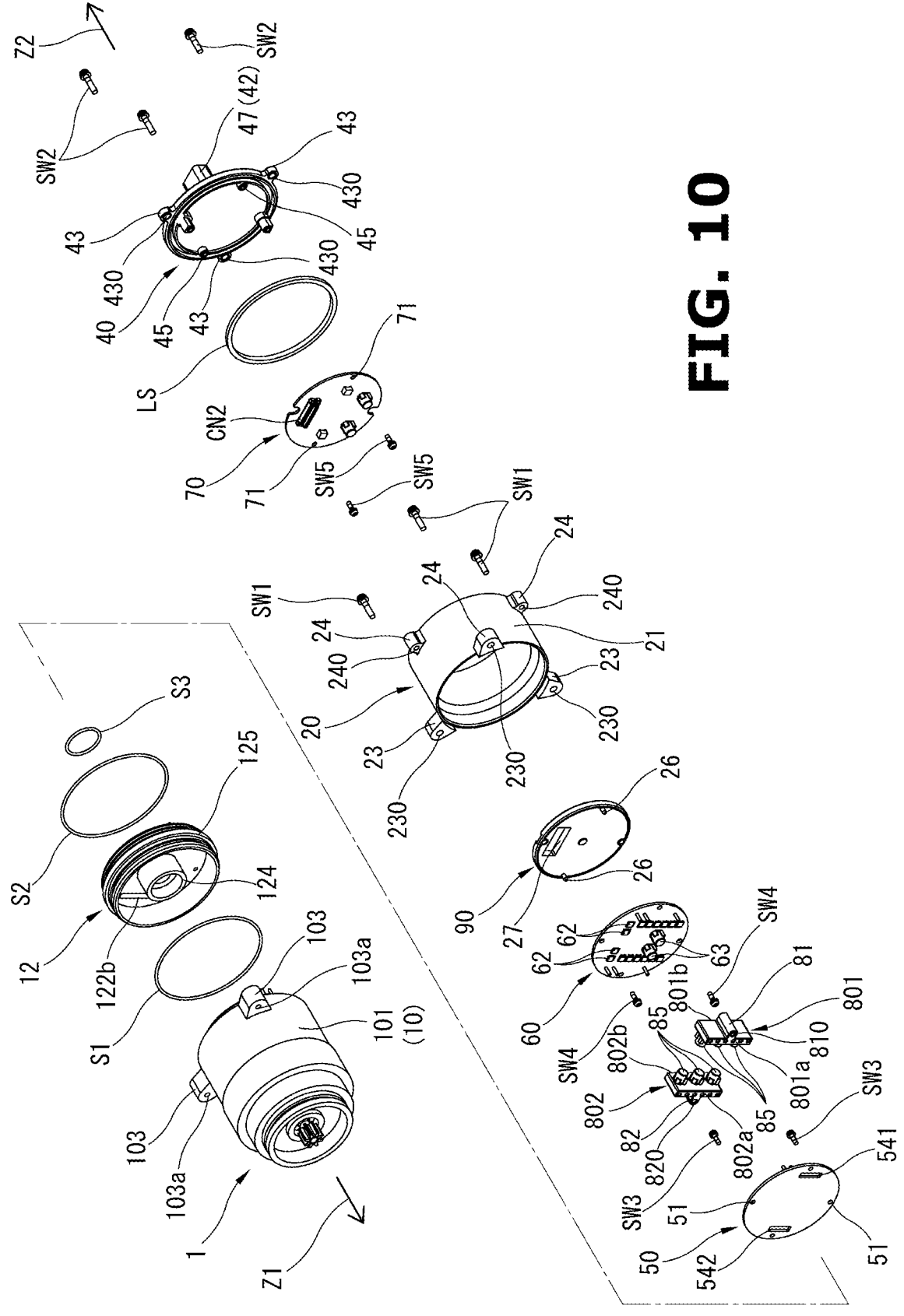
FIG. 10 is an exploded perspective view of the electronic control device according to the third embodiment of the present invention as viewed from a motor side.
Figure 11:
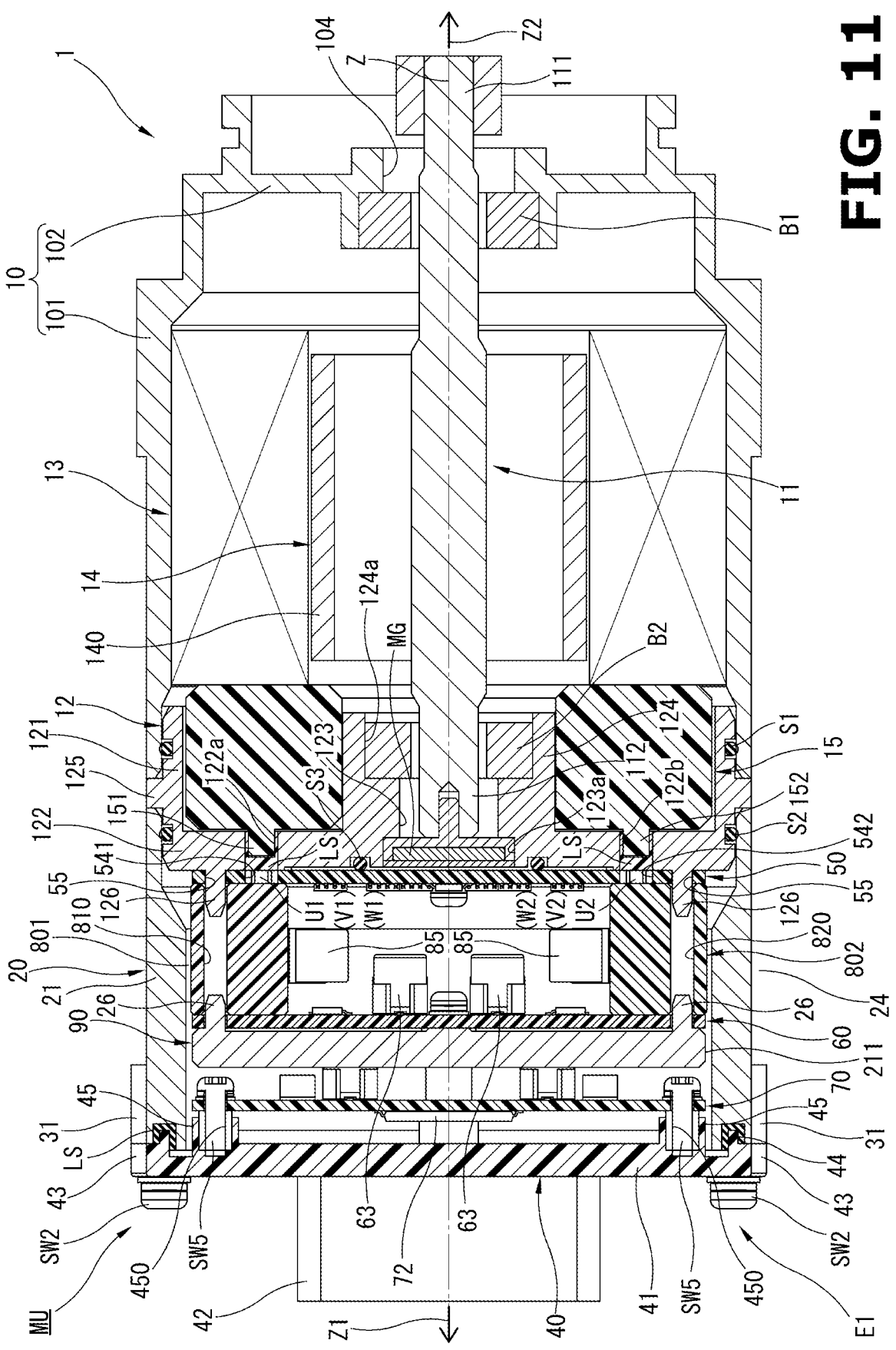
FIG. 11 is a longitudinal sectional view of the electronic control device taken along an axis Z in FIG. 9.

FIGS. 9 to 11 show an electronic control device according to a third embodiment of the present invention, in which the configuration of the second housing 20 of the electronic control device E2 according to the second embodiment is modified. Except for this modification, the third embodiment has the same basic configuration as the second embodiment. The same components as in the second embodiment are denoted by the same reference numerals, and description thereof is omitted.

FIG. 9 shows an exploded perspective view of a motor unit MU provided with an electronic control device E3 according to the present embodiment as viewed from the cover 40 side. FIG. 10 shows an exploded perspective view of the motor unit MU provided with the electronic control device E3 according to this embodiment as viewed from the motor 1 side. FIG. 11 shows a longitudinal sectional view of the motor unit MU taken along the axis Z in FIG. 9. For convenience of description about FIGS. 9 to 11, in the axial direction, the side on which the motor 1 is arranged is referred to as "first end side Z1", and the side on which the electronic control device E3 is arranged is referred to as "second end side Z2".

As shown in FIGS. 9 to 11, the electronic control device E3 according to the present embodiment is configured such that the second housing division wall part 22 according to the second embodiment is modified to be formed as a heat sink member 90 separately from the second housing 20.

The heat sink member 90 is made of a metal material with relatively high heat dissipation, such as an aluminum alloy material similar to the second housing 20, and is formed in a substantially disc shape. The first end side Z1 face of the heat sink member 90 is formed with second connecting projections 26, 26 which are similar to the first connecting projections 126, 126, located to correspond in position to the first connecting projections 126, 126, and project in the axial direction. The heatsink member 90 is fixed to the connection members 801 and 802 via the second connecting projections 26 and 26. Specifically, the heat sink member 90 is fixed to the connection members 801 and 802 together with the second board 60, by engagement with the first fitting hole 810 and the second fitting hole 820 of the connection members 801, 802 through the second projection through holes 66, 66 of the second board 60.

In this embodiment, the second board 60 is separately fastened to the heat sink member 90 by the fourth screws SW4. However, depending on the fitting between second connecting projections 26, 26 and the second projection through holes 66, 66, the fastening by the fourth screw SW4 may be omitted.

As described above, in the present embodiment: the division wall (heatsink member 90) is formed separately from the second housing 20; the first board 50 is fixed to the bearing holder 12; and the second board 60 is fixed to the division wall (heatsink member 90).

The feature that the second housing 20 and the division wall (heat sink member 90) are separately formed, the first board 50 is fixed to the bearing holder 12, and the second board 60 is fixed to the division wall (heat sink member 90), serves to allow the first board 50 and the second board 60 to be properly accommodated in the second housing 20 without being affected by the dimensional accuracy of the second housing 20, the first board 50, and the second board 60.

The present invention is not limited to the exemplary embodiments described above. The embodiments may be arbitrarily modified in accordance with specifications, costs, etc. of a target to which the invention is applied, as long they can achieve the advantageous effects of the present invention described above.

In particular, in the present embodiments, the first board 50 and the second board 60 are each made of a resin material (glass epoxy resin). However, the first board 50 and the second board 60 may be each formed as a metal board made of a metal material.

The electronic control devices according to the embodiments described above may be exemplified as follows.

According to an embodiment, an electronic control device for driving and controlling a motor having three-phase windings, includes: a circuit board set to which an electronic component is mounted for driving and controlling the motor, wherein the circuit board set includes a first board and a second board, and wherein the first board and the second board are opposed to each other; a first terminal set mounted to a first side of the first board facing the second board, and employed for connection to the second board; a second terminal set mounted to a first side of the second board facing the first board, and employed for connection to the first board; and a connection member disposed between the first board and the second board, connected to the first terminal set and the second terminal set, and structured to maintain a constant distance between the first board and the second board.

In a preferable embodiment, the electronic control device is configured such that: the motor includes a motor rotating shaft, wherein the motor rotating shaft has a first end part and a second end part opposite to the first end part, wherein the first end part outputs a driving force of the motor; the electronic control device is arranged closer to the second end part than to the first end part; and the first terminal set includes a terminal connected to the three-phase windings.

According to another preferable embodiment, the electronic control device according to one of the foregoing embodiments is configured such that the connection member electrically connects the first terminal set and the second terminal set to each other.

According to another preferable embodiment, the electronic control device according to one of the foregoing embodiments includes: a first housing accommodating at least a part of the motor; and a second housing provided with a division wall facing the second end part of the motor rotating shaft, wherein the first board, the second board, and the connection member are accommodated in an internal space of the second housing between the division wall and the motor; wherein a second side of the second board opposite to the first side of the second board facing the first board abuts on the division wall.

According to another preferable embodiment, the electronic control device according to one of the foregoing embodiments includes: a bearing holder extending in an axial direction of the motor rotating shaft between the first housing and the second housing, and fitted with the first housing and the second housing; and a bearing held by the bearing holder, and structured to support the second end part of the motor rotating shaft; wherein a second side of the first board opposite to the first side of the first board facing the second board abuts on a face of the bearing holder on the second end part side of the motor rotating shaft.

According to another preferable embodiment, the electronic control device according to one of the foregoing embodiments is configured such that: the division wall is formed separately from the second housing; the first board is fixed to the bearing holder; and the second board is fixed to the division wall.

According to another preferable embodiment, the electronic control device according to one of the foregoing embodiments includes: a magnet attached to the second end part of the motor rotating shaft; and a rotational angle sensor mounted to the second side of the first board opposite to the first side of the first board facing the second board, arranged to correspond in position to the magnet, and structured to sense a rotational angle of the motor rotating shaft.

According to another preferable embodiment, the electronic control device according to one of the foregoing embodiments is configured such that: the circuit board set further includes a third board; a control circuit part is mounted to the third board, and has a main function of driving and controlling the motor; and the third board is accommodated in a third housing arranged at a side of the second housing opposite to a side of the second housing facing the first housing.

According to another preferable embodiment, the electronic control device according to one of the foregoing embodiments includes: a power supply terminal and a ground terminal provided to a side face of the connection member, wherein the power supply terminal is branched from a power supply connected to a power conversion circuit section having a main function of driving the motor, and wherein the ground terminal is branched from a ground; and a capacitor connected to the power supply terminal and the ground terminal, and configured to rectify an electric current of the power conversion circuit section.

According to another preferable embodiment, the electronic control device according to one of the foregoing embodiments is configured such that the capacitor is arranged to be perpendicular to the connection member.

The invention claimed is:

1. An electronic control device for driving and controlling a motor having three-phase windings, the electronic control device comprising:
   a circuit board set to which an electronic component is mounted for driving and controlling the motor, wherein the circuit board set includes a first board and a second board, and wherein the first board and the second board are opposed to each other;
   a first terminal set mounted to a first side of the first board facing the second board, and employed for connection to the second board;
   a second terminal set mounted to a first side of the second board facing the first board, and employed for connection to the first board; and
   a connection member disposed between the first board and the second board, connected directly to the first terminal set and the second terminal set, and structured to maintain a constant distance between the first board and the second board, wherein the first board and the second board are electrically connected to each other via the connection member.

2. The electronic control device as claimed in claim 1, wherein:
   the motor includes a motor rotating shaft, wherein the motor rotating shaft has a first end part and a second end part opposite to the first end part, wherein the first end part outputs a driving force of the motor;
   the electronic control device is arranged closer to the second end part than to the first end part; and
   the first terminal set includes a terminal connected to the three-phase windings.

3. The electronic control device as claimed in claim 2, wherein the connection member electrically connects the first terminal set and the second terminal set to each other.

4. The electronic control device as claimed in claim 3, comprising:
   a first housing accommodating at least a part of the motor; and
   a second housing provided with a division wall facing the second end part of the motor rotating shaft, wherein the first board, the second board, and the connection member are accommodated in an internal space of the second housing between the division wall and the motor;
   wherein a second side of the second board opposite to the first side of the second board facing the first board abuts on the division wall.

5. The electronic control device as claimed in claim 4, comprising:

a bearing holder extending in an axial direction of the motor rotating shaft between the first housing and the second housing, and fitted with the first housing and the second housing; and a bearing held by the bearing holder, and structured to support the second end part of the motor rotating shaft;

wherein a second side of the first board opposite to the first side of the first board facing the second board abuts on a face of the bearing holder on the second end part side of the motor rotating shaft.

6. The electronic control device as claimed in claim 5, wherein:

the division wall is formed separately from the second housing;

the first board is fixed to the bearing holder; and the second board is fixed to the division wall.

7. The electronic control device as claimed in claim 6, comprising:

a magnet attached to the second end part of the motor rotating shaft; and a rotational angle sensor mounted to the second side of the first board opposite to the first side of the first board facing the second board, arranged to correspond in position to the magnet, and structured to sense a rotational angle of the motor rotating shaft.

8. The electronic control device as claimed in claim 4, wherein:

the circuit board set further includes a third board;

a control circuit part is mounted to the third board, and has a main function of driving and controlling the motor; and the third board is accommodated in a third housing arranged at a side of the second housing opposite to a side of the second housing facing the first housing.

9. The electronic control device as claimed in claim 8, comprising:

a magnet attached to the second end part of the motor rotating shaft; and a rotational angle sensor mounted to the second side of the first board opposite to the first side of the first board facing the second board, arranged to correspond in position to the magnet, and structured to sense a rotational angle of the motor rotating shaft.

10. The electronic control device as claimed in claim 3, comprising:

a power supply terminal and a ground terminal provided to a side face of the connection member, wherein the power supply terminal is branched from a power supply connected to a power conversion circuit section having a main function of driving the motor, and wherein the ground terminal is branched from a ground; and a capacitor connected to the power supply terminal and the ground terminal, and configured to rectify an electric current of the power conversion circuit section.

11. The electronic control device as claimed in claim 10, wherein the capacitor is arranged to be perpendicular to the connection member.

* * * * *